July 7, 1964 J. D. BIELINSKI 3,140,105
TOGGLE OPERATED COUPLING FOR FLUID CARRYING CONDUITS
Filed May 17, 1961 2 Sheets-Sheet 1

*INVENTOR.*
JOSEPH D. BIELINSKI
BY
ATTORNEY

July 7, 1964  J. D. BIELINSKI  3,140,105
TOGGLE OPERATED COUPLING FOR FLUID CARRYING CONDUITS
Filed May 17, 1961  2 Sheets-Sheet 2

*INVENTOR.*
JOSEPH D. BIELINSKI
BY
ATTORNEY

United States Patent Office 3,140,105
Patented July 7, 1964

---

3,140,105
TOGGLE OPERATED COUPLING FOR FLUID CARRYING CONDUITS
Joseph D. Bielinski, 2463 N. 1st St., Milwaukee 12, Wis.
Filed May 17, 1961, Ser. No. 110,670
2 Claims. (Cl. 285—71)

My invention relates to couplings for fluid conduits, and more particularly to a quick disconnect coupling comprised of identical coupling members.

A principal object of this invention is to provide a coupling for fluid conduits, which coupling is characterized by identical coupling members having links for coupling the members together and imposing a strain on the links so as to seal the couplings against loss of fluid thereat.

Another object is to provide a coupling comprised of coupling members which can be rapidly connected, and in such a fashion that there is no leakage.

Yet another object is to provide coupling members arranged with seals that are tightly closed when the members are brought together in a connection, and to impose on such seals a load as desired.

Other and further objects of the invention will become more apparent as the description proceeds, when taken in conjunction with the drawings, in which.

Figure 1:
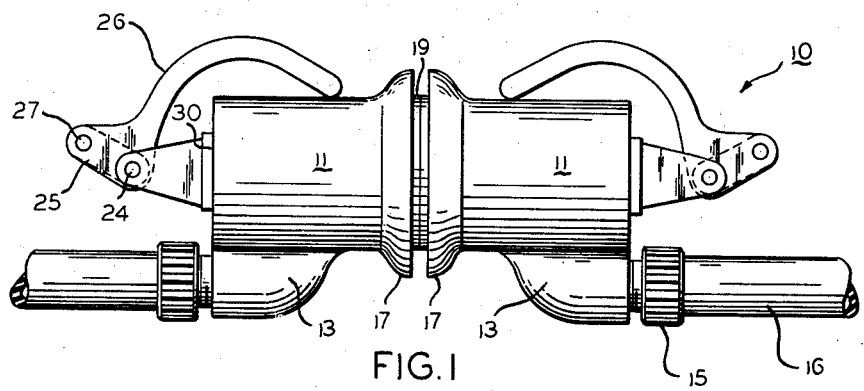
FIG. 1 is an elevational view of a pair of an improved coupling according to one embodiment of the invention.

Referring now particularly to FIGS. 1 to 4 of the drawings, a first embodiment of the invention is denoted by the reference numeral 10, and consists of two identical coupling members 11, each having a chamber 12 in opposing relationship to the chamber 12 of the other coupling member 11. Each chamber 12 has passageways 13 connected thereto, and these may be threaded as at 14 for connection to a flexible conduit 15.

Each coupling member 11 is provided with a confronting flange 17, and an annular recess 18 in each flange 17 supports a sealing member 19, constructed of rubber or the like, the two sealing members 19 when in contact effecting a seal for the confronting chambers 12.

Figure 2:
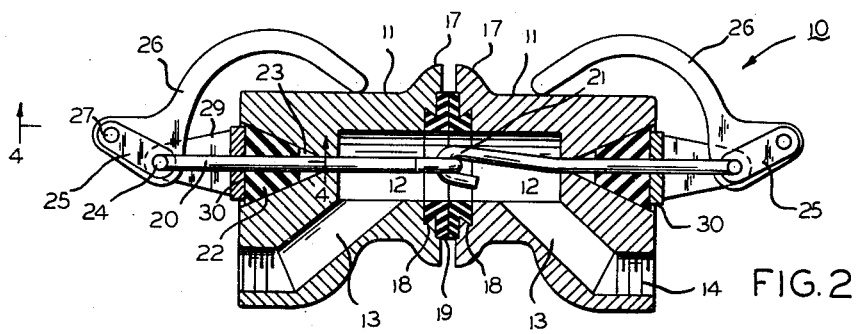
FIG. 2 is a longitudinal cross-sectional view thereof.
Figure 3:
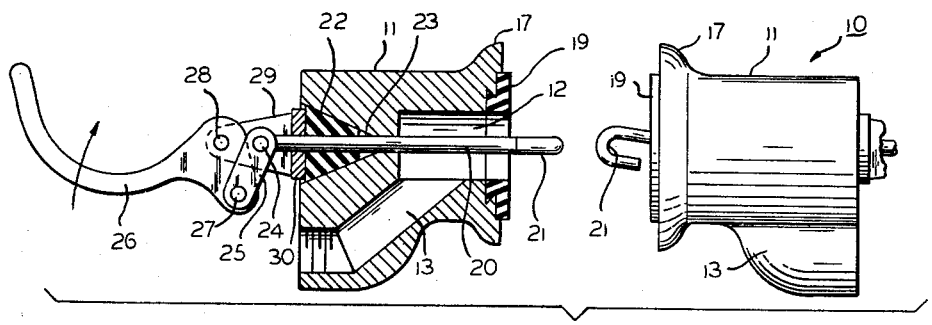
FIG. 3 is an exploded or disconnected view of the coupling seen in FIG. 1, one of the coupling units being shown in cross-section.
Figure 4:
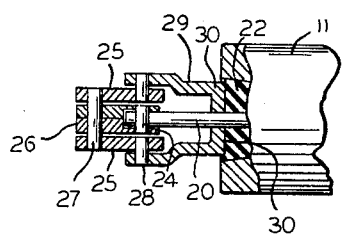
FIG. 4 is a fragmentary cross-sectional view taken along the line 4—4 of FIG. 3, looking in the direction of the arrows, showing details of mechanism for clamping the coupling members seen in FIGS. 1 and 2 together.

Structure is provided for clamping the two coupling members 11 together as seen in FIGS. 1 and 2, and to this end each coupling member 11 is provided with a coupling link 20 having a hook portion at the end thereof, each link 20 being engageable with the other as seen in FIG. 2. Each coupling link 20 extends through an externally tapered resilient plug 22 supported in a tapered recess in the coupling member 11.

The end of the coupling link 20 protruding beyond the coupling member 11 has a pin 24 passing therethrough, pin 24 also passing through a pair of link members 25 pivotally connected at 27 to a toggle lever 26. Toggle lever 26 is pivotally mounted upon a pair of pins 28 to a yoke or clevis 29 with a base 30 in contact with a base of the externally tapered plug 22.

It is believed evident that the operation of the toggle levers 26 and the coupling links 20 is apparent from the description thus far, but it may be noted that when the hook portions 21 of the coupling links 20 are brought together as seen in FIG. 2, that the rocking of the toggle levers 26 not only imposes a compressive force on the sealing members 19, but also imposes a compressive force against the externally tapered plug 22, so that a very good seal is afforded between the coupling members 11. Also, a very good seal is afforded between the coupling link 20 and its tapered plug 22 and the coupling member 11 and the tapered plug 22.

Figure 5:
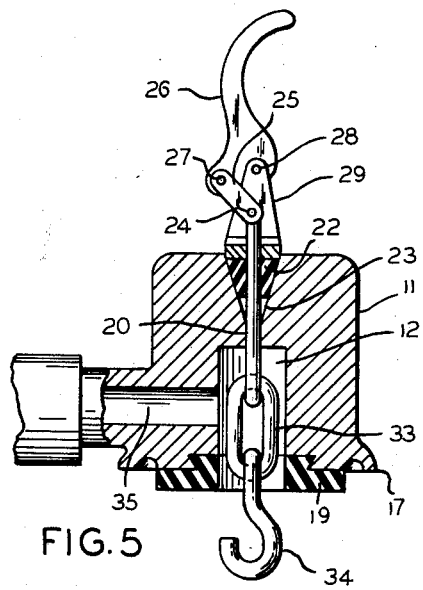
FIG. 5 is a cross-sectional view of a coupling unit according to another embodiment of the invention.

Referring now to FIG. 5 of the drawings, there is shown another embodiment of the invention in which the coupling link 20 is provided with a single link 33 for loosely supporting a separate hook 34.

In this embodiment of the invention inlet and outlet ports 35 are constructed at right angles to the body member 11 and also at right angles to the chamber 12.

Figure 6:
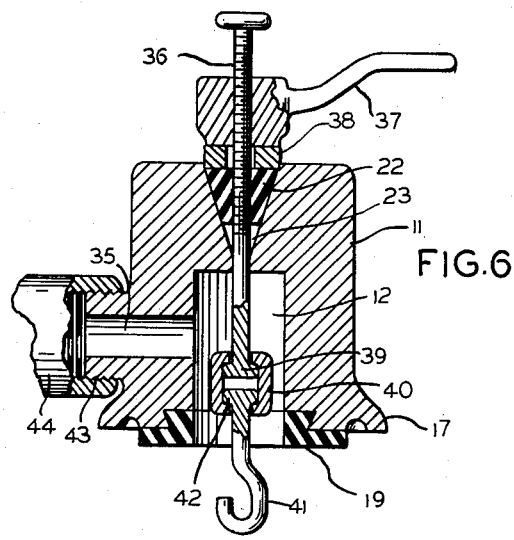
FIG. 6 is a similar view showing still another embodiment of the invention.

Referring now to FIG. 6 of the drawings, there is shown still another embodiment of the invention where the coupling link 20 is threaded at 36 throughout a portion of its length, such threaded portion extending through the externally tapered resilient plug 22. In order to provide a locking force between the coupling members 11 a hand lever 37 is threaded to a coupling link 20. Lever 37 contacts a flat washer 38 which in turn is in contact with the base of the tapered plug 22 and by imposing a strain upon the coupling link 20, a tight seal is effected between the tapered plug 22 and the body member 11 and the coupling link 20.

The end of the coupling link 20 as seen in FIG. 6 extending within the chamber 12 is upset at 39, and a collar 40 swaged about the flange 39 and a swaged end 42 of a coupling hook 41 enables the hook 41 to swivel and to rotate wtih respect to the coupling link 20.

As seen in FIG. 6, the coupling member 11 has a port 35 connected to the chamber 12, and includes a threaded boss 43 for securement of a conventional coupling 44.

Figure 7:
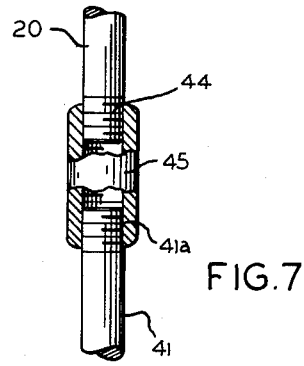
FIG. 7 is a fragmentary view showing details for adjusting the length of a coupling link adapted for use with the couplings according to the several embodiments of the invention.

If desired, and as seen in FIG. 7, the coupling link 20 can be threaded as at 44a at the end thereof extending within the chamber 12, and the coupling hook 41 can likewise be threaded at 41a, the two members 20 and 41 being connected together by a conventional coupling member 45.

Figure 8:
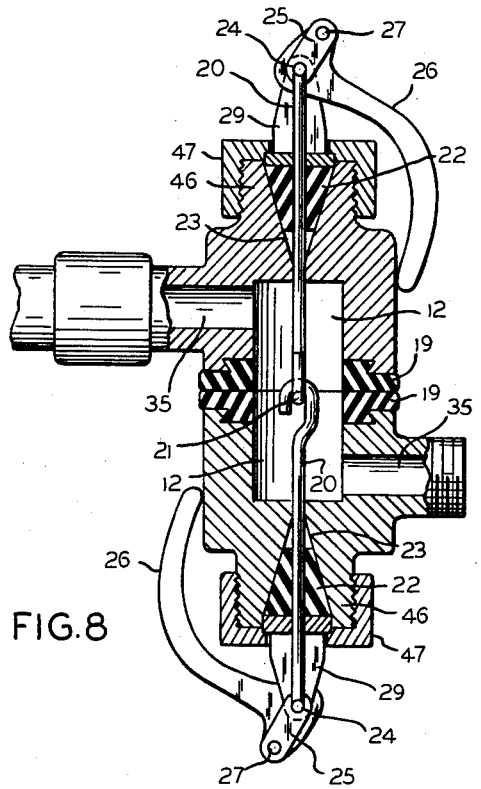
FIG. 8 is a cross-sectional view of still another embodiment of the invention.

Referring now to FIG. 8 of the drawings, coupling member 11 may be provided with a threaded boss 46 which cooperates with a threaded bonnet 47 which serves to guide the clevis 29.

In this embodiment of the invention, chambers 12 have the passageways 35 extending at right angles thereto as seen also in FIG. 5.

While I have shown some specific details and arrangements constituting several embodiments of my invention, I am fully cognizant that many other changes in form, shape, contour and configuration of the parts constituting the invention and their arrangement may be made without affecting their operativeness and function. I accordingly reserve the right to make such changes without affecting the scope of my invention as is measured by the claims here appended.

Having thus described my invention, what I claim and desire to secure by Letters Patent of the United States is:

1. In a coupling device, a pair of identical coupling members, each of said coupling members having means defining a chamber, each chamber being disposed in opposing relationship to the chamber of the other coupling member, a passageway communicating each chamber with a fluid line, and means effecting a connection between said coupling members comprising a coupling link supported for translatory motion by each coupling member and extending within its corresponding chamber, hook means on one end of each coupling link for effecting a connection to the other coupling link, resilient sealing means supported in said coupling member and forming a seal between said coupling link and said coupling member, said sealing means being tapered and fitting within a complementary tapered recess in said coupling member and means for imposing a coupling effort on said coupling link to compress said resilient sealing means against said recess and said coupling link when said coupling link is joined to a coupling link of the other coupling member, comprising a toggle lever pivotally mounted to the outer end of each coupling link arranged to rock between coupling effort and coupling release positions.

2. The invention as defined in claim 1 wherein said toggle lever is pivotally mounted on a support bearing against said tapered resilient sealing means.

References Cited in the file of this patent
UNITED STATES PATENTS

| | | |
|---|---|---|
| 318,790 | Patton | May 26, 1885 |
| 338,348 | Hamilton | Mar. 23, 1886 |
| 359,039 | Teichmann | Mar. 8, 1887 |
| 875,397 | Willis | Dec. 31, 1907 |
| 1,524,306 | Pearch | June 27, 1925 |
| 1,765,693 | Muend | June 24, 1930 |
| 2,574,281 | Olson | Nov. 6, 1951 |
| 2,638,126 | Hord | May 12, 1953 |